(12) United States Patent
Gleu et al.

(10) Patent No.: US 10,752,071 B2
(45) Date of Patent: Aug. 25, 2020

(54) AIR SPRING HAVING A PLEATED BELLOWS

(71) Applicant: Continental Teves AG & Co. oHG, Frankfurt (DE)

(72) Inventors: Jens-Uwe Gleu, Langenhagen (DE); Tiberiu Popa-Bianu, Sibiu (RO)

(73) Assignee: Continental Teves AG & Co. oHG (DE)

( * ) Notice: Subject to any disclaimer, the term of this patent is extended or adjusted under 35 U.S.C. 154(b) by 1 day.

(21) Appl. No.: 16/068,758

(22) PCT Filed: Jan. 27, 2017

(86) PCT No.: PCT/EP2017/051712
§ 371 (c)(1),
(2) Date: Jul. 9, 2018

(87) PCT Pub. No.: WO2017/129717
PCT Pub. Date: Aug. 3, 2017

(65) Prior Publication Data
US 2019/0016187 A1  Jan. 17, 2019

(30) Foreign Application Priority Data

Jan. 29, 2016 (EP) ..................................... 16465503
Feb. 22, 2016 (DE) ......................... 10 2016 202 642

(51) Int. Cl.
*F16F 9/05* (2006.01)
*B60G 11/27* (2006.01)
(Continued)

(52) U.S. Cl.
CPC ................. *B60G 11/27* (2013.01); *F16F 9/05* (2013.01); *F16F 9/38* (2013.01); *F16J 3/048* (2013.01);
(Continued)

(58) Field of Classification Search
CPC ...... F16F 9/05; F16F 9/38; F16F 9/361; F16F 9/0454; F16F 9/0463; F16F 2230/105; F16J 3/041; F16J 3/042
See application file for complete search history.

(56) References Cited

U.S. PATENT DOCUMENTS 4,235,426 A * 11/1980 Sullivan, Jr. ........... B60G 11/52
188/322.12
4,529,213 A    7/1985 Goodman
(Continued)

FOREIGN PATENT DOCUMENTS

DE          10302495 A1    9/2003
DE       102006046560 A1    4/2008
(Continued)

OTHER PUBLICATIONS

German Search Report for German Application No. 10 2016 202 642.9, dated Dec. 6, 2016, with partial translation—8 pages.
(Continued)

*Primary Examiner* — Bradley T King
(74) *Attorney, Agent, or Firm* — RatnerPrestia

(57) ABSTRACT

A pneumatic spring for a running gear of a motor vehicle, including a pneumatic spring cover and a pneumatic spring piston, wherein a pneumatic spring bellows composed of elastomer material is braced in air-tight fashion between the pneumatic spring cover and the pneumatic spring piston, wherein the pneumatic spring bellows is at least partially surrounded by a sleeve-like outer guide, wherein a corrugated bellows surrounds the pneumatic spring bellows and the outer guide, and wherein, between the outer guide and the corrugated bellows, there is provided a separately formed, air-permeable fastener by which the corrugated bellows is fixed to the outer guide.

17 Claims, 3 Drawing Sheets

(51) Int. Cl.
*F16F 9/38* (2006.01)
*F16J 3/04* (2006.01)

(52) U.S. Cl.
CPC .. *B60G 2202/152* (2013.01); *B60G 2204/126* (2013.01); *B60G 2206/42* (2013.01); *B60G 2206/424* (2013.01); *F16F 2230/105* (2013.01)

(56) References Cited

U.S. PATENT DOCUMENTS

| | | | | |
|---|---|---|---|---|
| 5,402,868 | A * | 4/1995 | Handke | F16F 9/38 188/322.12 |
| 6,460,665 | B1 * | 10/2002 | Gotz | B60G 15/14 188/322.12 |
| 8,979,076 | B2 | 3/2015 | Oldenettel | |
| 9,435,393 | B2 | 9/2016 | Gleu | |
| 2003/0151177 | A1 * | 8/2003 | Bank | F16F 9/0445 267/122 |
| 2004/0026837 | A1 * | 2/2004 | Ferrer | F16F 9/0454 267/64.23 |
| 2010/0001446 | A1 | 1/2010 | Oldenettel et al. | |
| 2010/0237549 | A1 * | 9/2010 | Jeischik | B60G 15/14 267/122 |
| 2011/0169203 | A1 * | 7/2011 | Watanabe | F16F 9/0454 267/122 |
| 2012/0112392 | A1 * | 5/2012 | Oldenettel | F16F 9/055 267/64.27 |
| 2014/0374972 | A1 * | 12/2014 | Kroger | F16F 9/0454 267/35 |
| 2015/0159725 | A1 * | 6/2015 | Gleu | F16F 9/38 267/64.24 |
| 2017/0219041 | A1 * | 8/2017 | Debruler | B60G 15/12 |
| 2019/0186580 | A1 * | 6/2019 | Pielock | F16F 9/38 |

FOREIGN PATENT DOCUMENTS

| | | |
|---|---|---|
| DE | 102009003829 A1 | 10/2010 |
| DE | 102010038239 A1 | 4/2012 |
| DE | 102012000120 A1 | 7/2013 |
| DE | 102013211644 A1 | 1/2014 |
| DE | 102013107826 A1 | 1/2015 |
| DE | 102014222945 A1 | 6/2015 |
| EP | 2133604 A1 | 12/2009 |
| FR | 2843931 A1 | 3/2004 |
| GB | 2262150 A | 6/1993 |
| JP | 2006009945 A | 1/2006 |
| JP | 2009063014 A | 3/2009 |

OTHER PUBLICATIONS

International Search Report and Written Opinion for International Application No. PCT/EP2017/051712, dated May 26, 2017—9 pages.
Chinese Office Action for Chinese Application No. 201780008709.8, dated Jul. 30, 2019, with translation, 12 pages.

* cited by examiner

AIR SPRING HAVING A PLEATED BELLOWS

CROSS REFERENCE TO RELATED APPLICATIONS

This application is the U.S. National Phase Application of PCT International Application No. PCT/EP2017/051712, filed Jan. 27, 2017, which claims priority to European Patent Application No. 16465503.7, filed Jan. 29, 2016 and German Patent Application No. 10 2016 202 642.9, filed Feb. 22, 2016, the contents of such applications being incorporated by reference herein.

FIELD OF THE INVENTION

The invention relates to a pneumatic spring.

BACKGROUND OF THE INVENTION

Pneumatic springs or pneumatic spring struts which are braced between a running gear and a body of a motor vehicle and which have a pneumatic spring bellows, which in turn is fastened between a pneumatic spring cover and a pneumatic spring piston, are known in a multiplicity of embodiments. During operation, the pneumatic spring is subject to an internal positive pressure. The pneumatic spring bellows rolls under load and during spring deflection movements so as to form a roll fold on the outer contour of the concentric pneumatic spring piston which, in the case of a pneumatic spring strut, is fastened to a cylinder tube of the shock-absorbing damper.

In the case of pneumatic springs in the passenger motor vehicle sector, pneumatic spring bellows with the thinnest possible walls are used because these ensure a high level of rolling comfort. In order, in the case of these, to realize a satisfactory load-bearing capacity of the system as a whole, the pneumatic spring bellows or the pneumatic springs are equipped with outer guides, specifically with a tubular sleeve surrounding the pneumatic spring bellows, as a supporting corset or supporting body. It is accordingly possible, for example, for a thin pneumatic spring bellows with a thin light metal sleeve as a supporting body to be optimized for high internal pressures, and thus for high load-bearing capacity, while simultaneously having good harshness characteristics. Here, the outer guides are designed and arranged such that the pneumatic spring bellows can roll, on the one hand, on the outer side of the pneumatic spring rolling piston and, on the other hand, on the inner surface of the outer guide.

This however has the disadvantage that such pneumatic spring bellows, in relation to thick-walled and thus more robust pneumatic spring bellows in the utility vehicle sector, react very much more sensitively to deposits and foreign bodies on the rolling surfaces. The comfortable pneumatic spring bellows, when it rolls over deposits or foreign bodies, very readily reacts with intense abrasion or destruction of its filigree reinforcement members, which can result in failure of the pneumatic spring.

It is therefore necessary that the roll folds of the pneumatic spring bellows be afforded particular protection, which is achieved by way of a protective bellows or corrugated bellows surrounding the pneumatic spring. In particular in the case of externally guided pneumatic springs, use is made of a corrugated bellows to protect the pneumatic spring bellows against fouling (for example dust, sand or stones from the road during driving operation), such as is known for example from DE 103 02 495 A1, incorporated herein by reference. The use of a corrugated bellows however gives rise to the problem that, during spring deflection movements of the pneumatic spring, the air volume of the space surrounded by the corrugated bellows simultaneously changes, and thus an exchange of air must take place between the air enclosed by the corrugated bellows and the contaminated air outside.

In the case of a pneumatic spring strut, the corrugated bellows is attached to the lower end of the shock-absorbing damper piston and to the lower end of the outer guide, such as emerges for example from DE 10 2013 211 644 A1, incorporated herein by reference. The corrugated bellows is fastened to the outer guide in sealed fashion and to the piston with ventilation openings, such that a certain exchange of air can take place at the piston end. It is sought in this way to ensure that no dirt can enter the interior of the corrugated bellows from above, and the dirt that has entered by being sucked in can escape to the outside again in the direction of the running gear.

The arrangement of the corrugated bellows vent at the bottom, facing toward the running gear, of the corrugated bellows has the effect that, during spring compression movements of the pneumatic spring, owing to the associated decrease in volume in the corrugated bellows interior, the air is discharged downward in the direction of the running gear, the pneumatic spring bellows simultaneously exposes an increasing region of the contact surface on the outer guide, and the pneumatic spring rolling piston covers a potentially fouled region. During spring extension movements of the pneumatic spring, owing to the increase in volume in the corrugated bellows interior, potentially contaminated air is sucked in from below, and the pneumatic spring bellows simultaneously covers an increasing and potentially fouled region of the contact surface on the outer guide and exposes contact surface on the piston. A disadvantage is thus that, during spring deflection movements, dust and/or foreign bodies are sucked into the interior of the corrugated bellows. This becomes a problem if such material does not escape to the outside again but passes into the rolling region of the pneumatic spring bellows, which has the effect that the corrugated bellows has lost its required protective function, and damage to the pneumatic spring bellows is not ruled out.

In the case of a pneumatic spring such as is known from DE 10 2009 003 829 A1, incorporated herein by reference, the corrugated bellows is fastened to a collar or projection of the outer guide. The collar is part of the outer guide and has a vent in the form of multiple ventilation bores. Since the pneumatic spring is situated in an upside-down position, the collar of the outer guide faces toward the running gear. The ventilation of the corrugated bellows thus takes place at the bottom of the corrugated bellows. This type of fastening necessitates a certain spacing between outer guide and corrugated bellows, which however has a disadvantageous effect on the usable pneumatic spring bellows volume owing to the small available structural space. An outer guide of said type is also disadvantageous in the manufacturing process, because further manufacturing steps are necessary, for example the deformation of the collar and the formation of the ventilation bores.

SUMMARY OF THE INVENTION

An aspect of the invention therefore aims to provide an improved fastening of a corrugated bellows to an outer guide.

According to an aspect of the invention, a pneumatic spring for a running gear of a motor vehicle is provided, wherein the pneumatic spring comprises a pneumatic spring cover and comprises a pneumatic spring piston, wherein a pneumatic spring bellows composed of elastomer material is braced in air-tight fashion between the pneumatic spring cover and the pneumatic spring piston, wherein the pneumatic spring bellows is at least partially surrounded by a sleeve-like outer guide, wherein a corrugated bellows surrounds the pneumatic spring bellows and the outer guide, wherein, between the outer guide and the corrugated bellows, there is provided a separately formed, air-permeable fastening means by means of which the corrugated bellows is fixed to the outer guide.

By means of the separate, air-permeable fastening means, a simple fixing of the corrugated bellows to the outer guide is realized which nevertheless permits a good air transfer flow. In this way, the ventilation of the space surrounded by the corrugated bellows is made possible, whereby no vacuum can form during pneumatic spring operation. By virtue of the fastening means being provided as an additional element on the outer guide, no major modifications to a conventional outer guide are necessary.

The preferred embodiment of a multi-part fastening means has the advantage that the main functions (fixing of corrugated bellows to the outer guide and ventilation of the corrugated bellows) can be distributed, and thus implemented in the best possible manner. The fastening means preferably comprises an adapter ring and a bracing means. By means of the embodiment of an adapter ring manufactured from plastic and of a bracing means which may be, for example, a cable tie, an easily assemblable and inexpensive fastening for the corrugated bellows is realized. The bracing means ensures reliable fixing to the outer guide, and the adapter ring permits the ventilation.

According to a further preferred embodiment, the adapter ring is discontinuous in a circumferential direction, or a segment is cut out. In this way, a flexible and adaptable adapter ring is advantageously created, which can be reduced in diameter. The corrugated bellows is preferably fastened by way of the adapter ring to the outer guide, wherein the adapter ring is fastened to the outer guide by way of the bracing means. The adapter ring is fastened to or distorted on the outer guide by way of the bracing means. The adapter ring is furthermore designed for fixing the corrugated bellows and permitting good ventilation. This has the advantage that, owing to the distortion of the bracing means, the adapter ring can be adapted in terms of its diameter to the diameter of the outer guide. By means of this design measure, a universally usable fastening means for different outer guides is created, without a specific adapter ring having to be manufactured for the respective usage situation.

According to a further preferred embodiment, the adapter ring comprises an inner ring and an outer ring, wherein the inner ring is connected to the outer ring. In this case, the inner ring forms a fastening surface for the bracing means, and the outer ring forms the fastening device for the corrugated bellows. The inner ring and the outer ring are particularly preferably connected to one another by way of isolated intermediate webs. The intermediate webs are provided such that recesses for the air transfer flow are formed in the adapter ring.

The bracing means is preferably insertable into the adapter ring, wherein said bracing means is particularly preferably inserted between the inner ring and the outer ring. The bracing means is advantageously seated so as to be pressed against the inner ring and also has only a small width, whereby the air can flow over the adapter ring without great resistance.

According to a further preferred embodiment, the inner ring has, in the direction of the outer ring, means for the fixing of the bracing means. The means are particularly preferably in the form of hooks or claws and serve for securing the bracing means against slippage in the adapter ring. The hooks are provided and distributed multiply on the inner ring in the circumferential direction. The inner ring preferably has, toward the outer guide, means for the fixing of the adapter ring to the outer guide. It is likewise preferable for the means, in the form of hooks or claws, to be provided multiply on the inner side of the inner ring in the circumferential direction, wherein the claws are arranged in each case on the upper and lower edge of the inner ring. By means of the claws, the adapter ring can be fixed securely and firmly to the outer guide.

According to a further preferred embodiment, the corrugated bellows has a fold with two angles, wherein the corrugated bellows is fixed in positively locking fashion by way of the fold to the adapter ring. The fold is particularly preferably formed by two right angles. To connect the corrugated bellows to the adapter ring, a single partially rectangular fold is provided, by means of which the corrugated bellows bears in positively locking fashion against the adapter ring. The positive locking is generated at the lower outer edge of the adapter ring, which likewise has a right angle. At the upper outer edge, the adapter ring provides a bevel, which is designed in an advantageous manner for the assembly process such that the corrugated bellows can be easily pulled over the bevel from the direction of the pneumatic spring piston and is subsequently fixed at the lower edge.

According to a further preferred embodiment, the outer guide is fixed to the pneumatic spring bellows by way of an inner bracing ring.

The outer guide preferably has a narrowed clamping region, and here, the fastening means is particularly preferably positioned on the outer guide at the same level as the inner bracing ring, in the clamping region. Here, the inner fixing means of the inner ring advantageously bear against the crease edges of the narrowed clamping region, whereby particularly good fastening of the adapter ring is realized. Furthermore, the narrowed clamping region makes it possible to provide a compact design of the pneumatic spring with regard to the limited installation space. Owing to the fact that the fastening means is positioned in the narrowed clamping region, the outer diameter of the pneumatic spring is not significantly enlarged, and the corrugated bellows also does not need to have a relatively large diameter in the fastening region.

In a further preferred embodiment, the corrugated bellows surrounds the rolling surfaces of pneumatic spring piston and pneumatic spring cover, wherein the corrugated bellows is fastened to the pneumatic spring piston and/or pneumatic spring cover. Since the pneumatic spring bellows rolls, with the formation of a roll fold, on the pneumatic spring cover and/or pneumatic spring piston, it is necessary to protect the rolling surfaces and/or roll folds. It is accordingly possible for the corrugated bellows to be fastened by way of its upper end to the pneumatic spring piston, whereas the lower end at the pneumatic spring cover is free. In this way, the upper roll fold on the pneumatic spring piston is protected against fouling in an effective manner, and the free lower end of the corrugated bellows extends sufficiently beyond the fold at the pneumatic spring cover and, in conjunction with the air-permeable fastening means, permits free air circulation in the corrugated bellows.

The pneumatic spring is used in a running gear, preferably in a pneumatic suspension system, for a motor vehicle. The fastening of the corrugated bellows may preferably also be used in the case of a pneumatic spring with integrated shock-absorbing damper.

BRIEF DESCRIPTION OF THE DRAWINGS

Further preferred embodiments of aspects of the invention will emerge from the following description of exemplary embodiments on the basis of the figures, in which.

DETAILED DESCRIPTION OF THE PREFERRED EMBODIMENTS

Figure 1:
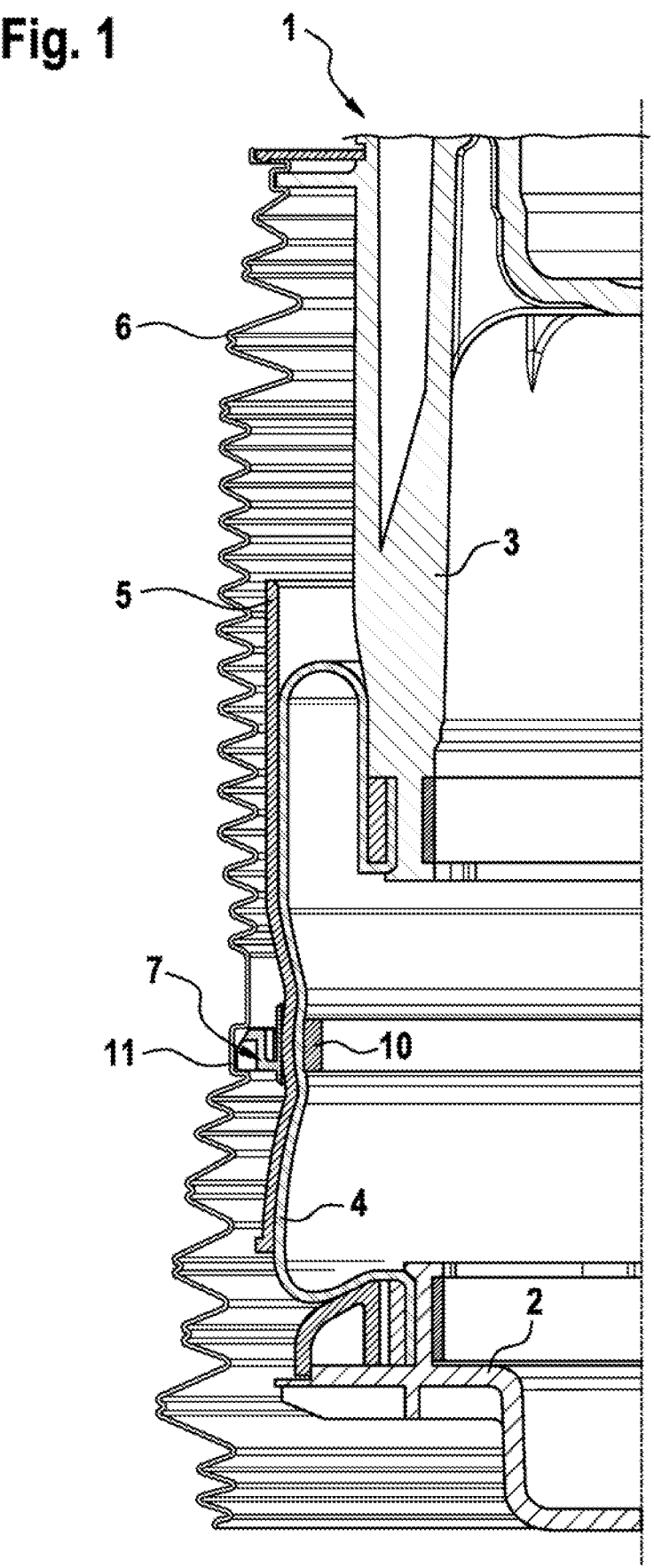
FIG. 1 shows an exemplary pneumatic spring.

FIG. 1 shows the left-hand half of a section of a pneumatic spring 1 situated in an upside-down position. Here, the pneumatic spring 1 comprises a pneumatic spring piston 3, which is fastened to a vehicle body, and a pneumatic spring cover 2, which is fastened to a wheel carrier. An elastomer pneumatic spring bellows 4 is braced in air-tight fashion between pneumatic spring piston 3 and pneumatic spring cover 2. The pneumatic spring bellows 4 rolls, with the formation of a roll fold, on the rolling surface of the pneumatic spring piston 3. On the pneumatic spring cover 2, the pneumatic spring bellows 4 forms a further fold, and may also partially roll on the pneumatic spring cover 2. The pneumatic spring bellows 4 is at least partially surrounded by a sleeve-like outer guide 5, wherein the outer guide 5 is fixed to the pneumatic spring bellows 4 by way of an inner bracing ring 10.

For protection of the roll folds, the pneumatic spring 1 is surrounded by a corrugated bellows 6. The corrugated bellows 6 is fixed by way of its upper end to the pneumatic spring piston 3 and, in the central region, by way of a fastening means 7 to the outer guide 5. The lower end of the corrugated bellows 6 in the region of the pneumatic spring cover 2 is free, and the corrugated bellows 6 extends, in terms of its length, beyond the region of the fastening of the pneumatic spring bellows 4 to the pneumatic spring cover 2.

Figure 2:
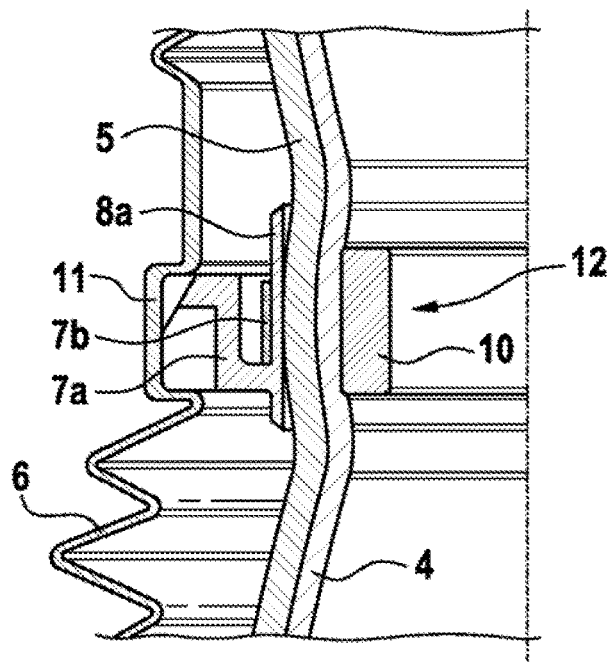
FIG. 2 shows an exemplary fastening of a corrugated bellows.

FIG. 2 shows, in a detail of the pneumatic spring, an exemplary fastening of the corrugated bellows 6 to the outer guide 5. Here, the fastening means 7 comprises an adapter ring 7a and a bracing means 7b. By way of the bracing means 7b, the adapter ring 7a is fixed to the outer guide 5 at a clamping region 12. In the interior of the pneumatic spring bellows 4, the inner bracing ring 10 is situated at the same height as the fastening means 7, in the clamping region 12.

The adapter ring 7a has, on its outer circumference, a lower edge and an upper edge, wherein the lower edge is of right-angled form and the upper edge has a bevel. The corrugated bellows 6 has a corresponding fold with two right angles, wherein the fold bears by way of the lower angle against the lower edge of the adapter ring 7a. In this way, the corrugated bellows 6 is fastened to the adapter ring 7a in positively locking fashion. The bevel of the upper edge of the adapter ring 7a serves to enable the corrugated bellows 6 to be pulled over the adapter ring 7a from the direction of the pneumatic spring piston. The adapter ring 7a is produced from a plastic, for example from polypropylene.

Figure 3:
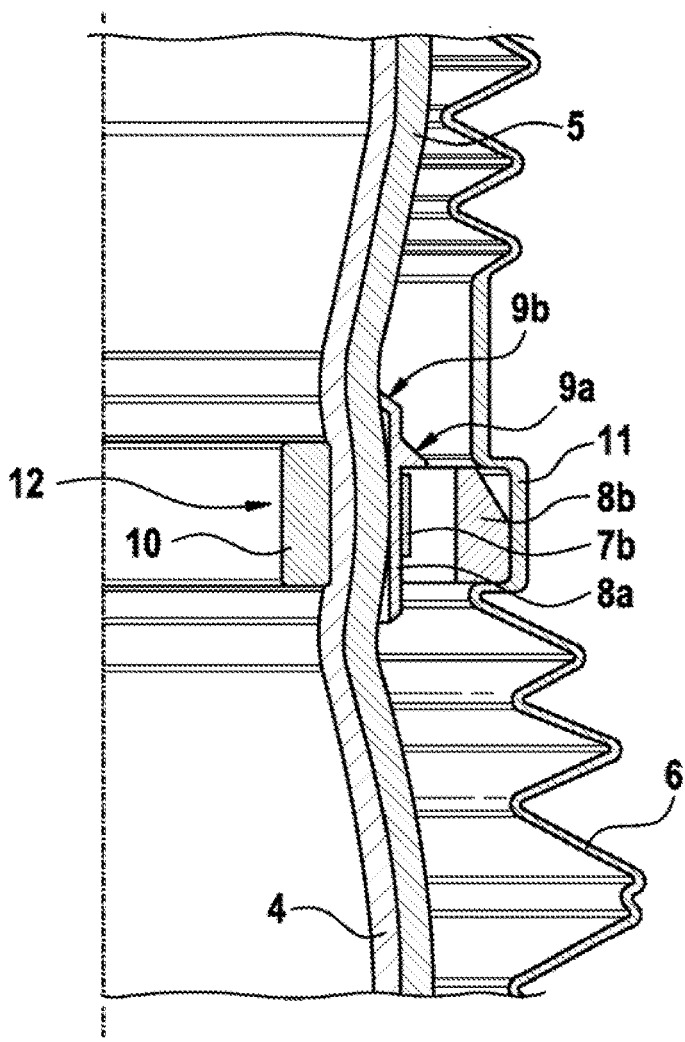
FIG. 3 shows a further detail of the fastening as per FIG. 2.

FIG. 3 shows, in a further detail of the pneumatic spring, the exemplary fastening of the corrugated bellows 6 to the outer guide 5. In detail, it can be seen that the adapter ring 7a is made up of an inner ring 8a and an outer ring 8b. The inner ring 8a and outer ring 8b are connected to one another. The connections are realized by way of isolated intermediate webs, wherein the inner ring 8a and outer ring 8b are connected to one another at least at the lower edges. Owing to the isolated intermediate webs, multiple recesses are formed. Owing to said recesses, the fastening means is air-permeable and thus permits a air circulation for the space between the pneumatic spring bellows 4 with outer guide 5 and corrugated bellows 6. The ventilation is important in order that, during operation, no vacuum can form in the space surrounded by the corrugated bellows 6. As described in the introduction, during spring compression movements, contaminated air can escape through the recesses of the fastening means, and during spring extension movements, the air can flow via the recesses into the space between pneumatic spring and corrugated bellows 6.

It can furthermore be seen that the bracing means 7b bears against the outer circumference of the inner ring 8a. For firm fixing and prevention of slippage of the bracing means 7b, fixing means 9a in the form of multiple hooks or claws are provided on the inner ring 8a in the direction of the outer ring 8b. Likewise, further fixing means 9b are situated on the upper and lower edge on the inner circumference of the inner ring 8b, which further fixing means, in the form of hooks or claws, securely fix the fastening means to the outer guide 5 in the clamping region 12 provided.

Figure 4:
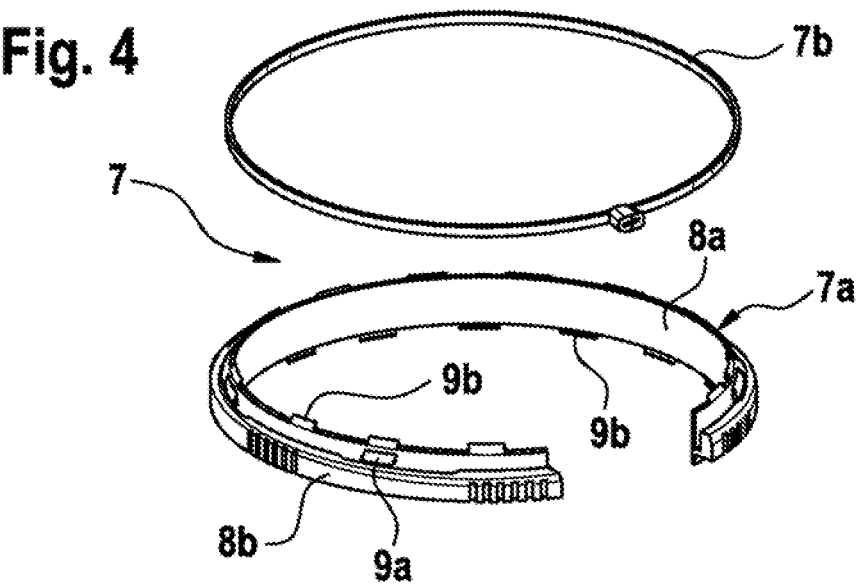
FIG. 4 shows an exemplary fastening means.

FIG. 4 shows the fastening means 7 composed of adapter ring 7a and bracing means 7b in a perspective view. The bracing means 7b may be in the form of a cable tie, and may be placed between the inner ring 8a and outer ring 8b. Furthermore, a multiplicity of fixing means 9a, 9b is formed on the inner ring 8a.

The adapter ring 7a is discontinuous in a circumferential direction, or a segment is cut out. In this way, during the fixing by way of the bracing means 7b, the adapter ring 7a is reduced in diameter and thus, in a simple manner, adapted to the outer guide and fastened to the latter in non-positively locking fashion. The inner bracing ring of the pneumatic spring acts as a counterpart to the fastening means 7, whereby a particularly advantageous combination of the fastening of the outer guide to the pneumatic spring bellows by way of the inner bracing ring and the fastening of the corrugated bellows to the outer guide by way of the fastening means 7 is realized.

Figure 5:
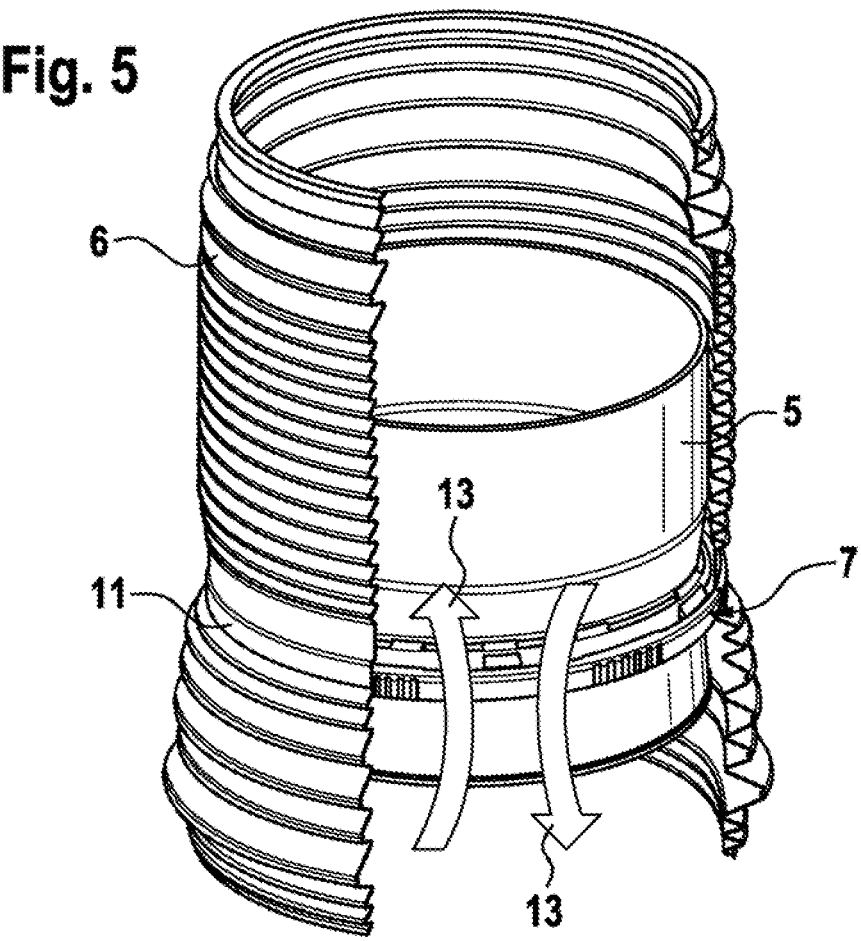
FIG. 5 shows the fastening as per FIGS. 2 and 3 in a perspective view.

FIG. 5 shows, in a perspective view, a cut-away corrugated bellows 6 with a view of the outer guide 5, wherein a fastening means 7 is fixed to the outer guide 5 and the corrugated bellows 6 is fixed by way of the fold 11 to the fastening means 7. The illustration shows the air transfer flow 13 which is made possible through the air-permeable fastening means 7, and which leads to air circulation in the corrugated bellows.

LIST OF REFERENCE DESIGNATIONS

1 Pneumatic spring
2 Pneumatic spring cover
3 Pneumatic spring piston

4 Pneumatic spring bellows
5 Outer guide
6 Corrugated bellows
7 Fastening means
7a Adapter ring
7b Bracing means
8a Inner ring
8b Outer ring
9a Fixing means
9b Fixing means
10 Inner bracing ring
11 Fold
12 Clamping region
13 Air transfer flow

The invention claimed is:

1. A pneumatic spring for a running gear of a motor vehicle, comprising:
   a pneumatic spring cover; and
   a pneumatic spring piston;
   a pneumatic spring bellows composed of elastomer material is braced in air-tight fashion between the pneumatic spring cover and the pneumatic spring piston;
   a sleeve-like outer guide at least partially surrounding the pneumatic spring bellows; and
   a corrugated bellows surrounding the pneumatic spring bellows and the outer guide,
   wherein, between the outer guide and the corrugated bellows, there is provided a separately formed, air-permeable fastening means by which the corrugated bellows is fixed to the outer guide, and
   wherein the fastening means is of multi-part form and comprises an adapter ring and a bracing means, the bracing means clamping the adapter ring onto the outer guide.

2. The pneumatic spring according to claim 1, wherein the adapter ring is discontinuous in a circumferential direction.

3. The pneumatic spring according to claim 1, wherein the corrugated bellows is directly fastened to the adaptor ring and is fastened by the adapter ring to the outer guide.

4. The pneumatic spring according to claim 1, wherein the adapter ring comprises an inner ring and an outer ring, wherein the inner ring is connected to the outer ring.

5. The pneumatic spring according to claim 4, wherein the inner ring has, toward the outer guide, means for the fixing of the adapter ring to the outer guide.

6. The pneumatic spring according to claim 4, wherein the bracing means is inserted into the adapter ring between the inner ring and outer ring.

7. The pneumatic spring according to claim 1, wherein the corrugated bellows has a fold with two right angles, wherein the corrugated bellows is fixed in positively locking fashion by way of the fold to the adapter ring.

8. The pneumatic spring according to claim 1, wherein the outer guide is fixed to the pneumatic spring bellows by an inner bracing ring.

9. The pneumatic spring according to claim 1, wherein the outer guide has a narrowed clamping region.

10. The pneumatic spring according to claim 1, wherein the corrugated bellows surrounds the rolling surfaces of pneumatic spring piston and pneumatic spring cover, wherein the corrugated bellows is fastened to the pneumatic spring piston and/or pneumatic spring cover.

11. A running gear for a motor vehicle, comprising a pneumatic suspension system, having a pneumatic spring according to claim 1.

12. The pneumatic spring according to claim 2, wherein the corrugated bellows is directly fastened to the adaptor ring and is fastened by the adapter ring to the outer guide.

13. The pneumatic spring according to claim 2, wherein the adapter ring comprises an inner ring and an outer ring, wherein the inner ring is connected to the outer ring.

14. The pneumatic spring according to claim 3, wherein the adapter ring comprises an inner ring and an outer ring, wherein the inner ring is connected to the outer ring.

15. A pneumatic spring for a running gear of a motor vehicle, comprising:
   a pneumatic spring cover; and
   a pneumatic spring piston;
   a pneumatic spring bellows composed of elastomer material is braced in air-tight fashion between the pneumatic spring cover and the pneumatic spring piston;
   a sleeve-like outer guide at least partially surrounding the pneumatic spring bellows; and
   a corrugated bellows surrounding the pneumatic spring bellows and the outer guide,
   wherein, between the outer guide and the corrugated bellows, there is provided a separately formed, air-permeable fastening means by which the corrugated bellows is fixed to the outer guide,
   wherein the fastening means comprises an adapter ring and a bracing means,
   wherein the adapter ring comprises an inner ring and an outer ring, wherein the inner ring is connected to the outer ring, and
   wherein the inner ring has, in the direction of the outer ring, means for the fixing of the bracing means.

16. The pneumatic spring according to claim 15, wherein the inner ring has, toward the outer guide, means for the fixing of the adapter ring to the outer guide.

17. A pneumatic spring for a running gear of a motor vehicle, comprising:
   a pneumatic spring cover; and
   a pneumatic spring piston;
   a pneumatic spring bellows composed of elastomer material is braced in air-tight fashion between the pneumatic spring cover and the pneumatic spring piston;
   a sleeve-like outer guide at least partially surrounding the pneumatic spring bellows; and
   a corrugated bellows surrounding the pneumatic spring bellows and the outer guide,
   wherein, between the outer guide and the corrugated bellows, there is provided a separately formed, air-permeable fastening means by which the corrugated bellows is fixed to the outer guide,
   wherein the outer guide is fixed to the pneumatic spring bellows by an inner bracing ring, and
   wherein the fastening means is positioned on the outer guide at a same axial position as the inner bracing ring.

* * * * *